US011680669B2

(12) United States Patent
Brown et al.

(10) Patent No.: US 11,680,669 B2
(45) Date of Patent: Jun. 20, 2023

(54) FLOW CONTROL CARTRIDGE

(71) Applicant: Schier Products Company, Edwardsville, KS (US)

(72) Inventors: Benjamin F. Brown, Overland Park, KS (US); Todd E. Uhlenhake, Lenexa, KS (US); Luke J. Ismert, Prairie Village, KS (US); Charles M. Ismert, Kansas City, MO (US); Connor O'Boyle, Olathe, KS (US); Grahm Heide, Overland Park, KS (US)

(73) Assignee: Schier Products Company, Shawnee, KS (US)

( * ) Notice: Subject to any disclaimer, the term of this patent is extended or adjusted under 35 U.S.C. 154(b) by 203 days.

(21) Appl. No.: 17/162,574

(22) Filed: Jan. 29, 2021

(65) Prior Publication Data

US 2021/0239247 A1 Aug. 5, 2021

Related U.S. Application Data

(60) Provisional application No. 62/968,699, filed on Jan. 31, 2020.

(51) Int. Cl.
| | |
|---|---|
| *E03F 5/16* | (2006.01) |
| *F16L 29/04* | (2006.01) |
| *F16L 33/32* | (2006.01) |
| *F16L 33/18* | (2006.01) |
| *B01D 21/00* | (2006.01) |
| *B01D 17/02* | (2006.01) |
| *B01D 21/24* | (2006.01) |

(52) U.S. Cl.
CPC .......... *F16L 29/04* (2013.01); *B01D 17/0208* (2013.01); *B01D 17/0214* (2013.01); *B01D 21/0006* (2013.01); *B01D 21/0024* (2013.01); *B01D 21/2405* (2013.01); *E03F 5/16* (2013.01); *F16L 33/18* (2013.01); *F16L 33/32* (2013.01)

(58) Field of Classification Search
CPC ... E03F 5/16; B01D 17/0208; B01D 21/0024; B01D 21/2405; C02F 1/40
USPC .......... 210/519, 532.1, 532.2, 538, 540, 801
See application file for complete search history.

(56) References Cited

U.S. PATENT DOCUMENTS

| | | | | | |
|---|---|---|---|---|---|
| 2,057,883 | A | * | 10/1936 | Dehn | ........................ E03F 5/16 |
| | | | | | 210/519 |
| 2,285,893 | A | * | 6/1942 | Boosey | .............. B01D 21/2405 |
| | | | | | 210/519 |
| 5,271,853 | A | * | 12/1993 | Batten | ................ B01D 17/0208 |
| | | | | | 210/519 |
| 5,505,860 | A | * | 4/1996 | Sager | ................ B01D 21/0024 |
| | | | | | 210/519 |
| 5,885,452 | A | * | 3/1999 | Koteskey | ............... B01D 29/35 |
| | | | | | 210/532.2 |

(Continued)

*Primary Examiner* — Christopher Upton
(74) *Attorney, Agent, or Firm* — Hovey Williams LLP

(57) ABSTRACT

A conduit assembly for a separation device is described herein. The conduit assembly includes a first conduit segment, a second conduit segment, and a removable flow control insert or cartridge, which may be easily installed and uninstalled without removing other components of the conduit assembly from the separation device. The flow control insert may be installed within a top opening of the second conduit segment and includes a projection that extends into the conduit assembly and obstructs or restricts fluid flow at the juncture between the first and second conduit segments.

19 Claims, 12 Drawing Sheets

(56) References Cited

U.S. PATENT DOCUMENTS

| | | | |
|---|---|---|---|
| 6,447,680 B1* | 9/2002 | Richard | B01D 35/0276 |
| | | | 210/532.2 |
| 7,481,321 B2 | 1/2009 | Ismert | |
| 10,315,135 B2 | 6/2019 | Brown et al. | |
| 2003/0141230 A1* | 7/2003 | Mokrzycki | E03F 5/16 |
| | | | 210/163 |
| 2018/0037476 A1* | 2/2018 | Brown | C02F 1/40 |

* cited by examiner

FLOW CONTROL CARTRIDGE

CROSS-REFERENCE TO RELATED APPLICATIONS

The present application claims the priority benefit of U.S. Provisional patent Application Ser. No. 62/968,699, filed Jan. 31, 2020, entitled FLOW CONTROL CARTRIDGE, incorporated by reference in its entirety herein.

BACKGROUND OF THE INVENTION

Field of the Invention

The present inventive concept relates to systems and devices for treating flowable streams including one or more liquid component(s). The present inventive concept more particularly relates to an improved conduit assembly for transporting streams to and from a separation compartment of a treatment system and/or device, which comprises a removable flow control insert or "cartridge".

Discussion of Related Art

Effluent separation devices for separating water from solids, greases and the like are often designed to perform much of the separation process as the stream flows through a separation compartment. Effluent flow is commonly delivered to the separation compartment by an input conduit, and transported from the separation compartment by an output conduit. Typically, separation compartments are located at or below the ground-level of an area proximate to an effluent source, such as a kitchen sink. Maintenance of separation devices may require access to and temporary removal of conduit components.

An advanced effluent treatment device is provided in U.S. Pat. No. 7,481,321, which is hereby incorporated herein by reference. Inlet and outlet conduits of the '321 Patent are connected to a separation chamber adjacent an aperture in the sidewall of the chamber using a coupling that extends through the aperture, illustrated in the figures. The coupling is configured to couple a first conduit length to a second conduit length (i.e., the "diffuser"), wherein the coupling includes a threaded portion located within the separation chamber. The unit further comprises a locking collar coupled to the diffuser and rotatable relative to the diffuser to threadably engage with the threaded portion of the coupling within the separation chamber to removably couple the diffuser to the coupling. The locking collar is meant to be rotated with respect to the diffuser and coupling such that the diffuser may be removed for cleaning or pressure testing.

An improved conduit assembly for an effluent treatment device is provided in U.S. Pat. No. 10,315,135, which is hereby incorporated herein by reference. The conduit assembly of the '135 Patent includes a pair of conduits removably attached using a saddle at one end of the first conduit configured to receive a flange on the second conduit. The entirety of the second conduit may be removed from the separation device by lifting the flange from the saddle of the first conduit leaving the first conduit secured within the separation device.

There is a need for an improved conduit assembly that can control or restrict the effluent fluid flow therethrough while being easily accessed for cleaning and other maintenance without the need to remove conduit segments from the separation device.

This background discussion is intended to provide information related to the present inventive concept which is not necessarily prior art.

SUMMARY

Embodiments of the present inventive concept solve one or more of the above-described and other problems and limitations by providing an improved conduit assembly for a flowable stream treatment system or device.

In one embodiment, there is provided a separation device comprising a sidewall at least partially defining a separation compartment and a conduit assembly. The conduit assembly includes a first conduit segment coupled to the sidewall and comprising a main body defining a hollow passage configured for fluid flow through the sidewall. The assembly also includes a second conduit segment coupled to said first conduit segment and defining a juncture between the first conduit segment and the second conduit segment. The second conduit segment comprises an aperture located at the juncture, an upper stem segment extending upward from the aperture and having a top opening, and a lower stem segment extending downward from the aperture and having a bottom opening providing fluid communication with the separation compartment. The assembly also includes an insert removably received within the top opening of the upper stem segment and at least partially obstructing fluid flow through the aperture.

In another embodiment, there is provided a separation device comprising a sidewall at least partially defining a separation compartment and a conduit assembly. The conduit assembly includes a first conduit segment coupled to the sidewall and comprising a main body defining a hollow passage configured for fluid flow through the sidewall. The assembly also includes a second conduit segment coupled to the first conduit segment and defining a juncture between the first conduit segment and the second conduit segment. The second conduit segment comprises a substantially cylindrical stem segment extending from the juncture and having a top opening. The assembly also includes an insert removably received within the top opening of the stem segment. The insert comprises a cap piece and a substantially cylindrical projection extending therefrom into the stem segment.

In another embodiment, there is provided a method of servicing the separation device. The method comprises rotating the cap piece and lifting the insert so as to remove the cylindrical projection from the stem segment.

This summary is provided to introduce a selection of concepts in a simplified form. These concepts are further described below in the detailed description of the preferred embodiments.

This summary is not intended to identify key features or essential features of the claimed subject matter, nor is it intended to be used to limit the scope of the claimed subject matter.

Various other aspects and advantages of the present inventive concept will be apparent from the following detailed description of the preferred embodiments and the accompanying drawing figures.

BRIEF DESCRIPTION OF THE DRAWINGS

Preferred embodiments of the present inventive concept are described in detail below with reference to the attached drawing figures, wherein.

DETAILED DESCRIPTION OF THE PREFERRED EMBODIMENTS

The present inventive concept is susceptible of embodiment in many different forms. While the drawings illustrate, and the specification describes, certain preferred embodiments of the invention, it is to be understood that such disclosure is by way of example only. There is no intent to limit the principles of the present inventive concept to the particular disclosed embodiments.

In this description, references to "one embodiment", "an embodiment", "certain embodiments", "one or more embodiments", or "embodiments" mean that the feature or features referred to are included in at least one embodiment of the invention. Separate references to "one embodiment", "an embodiment", or "embodiments" in this description do not necessarily refer to the same embodiment and are not mutually exclusive unless so stated. Specifically, a feature, structure, act, etc. described in one embodiment may also be included in other embodiments, but is not necessarily included. Thus, particular implementations of the present inventive concept can include a variety of combinations and/or integrations of the embodiments described herein.

Figure 1:
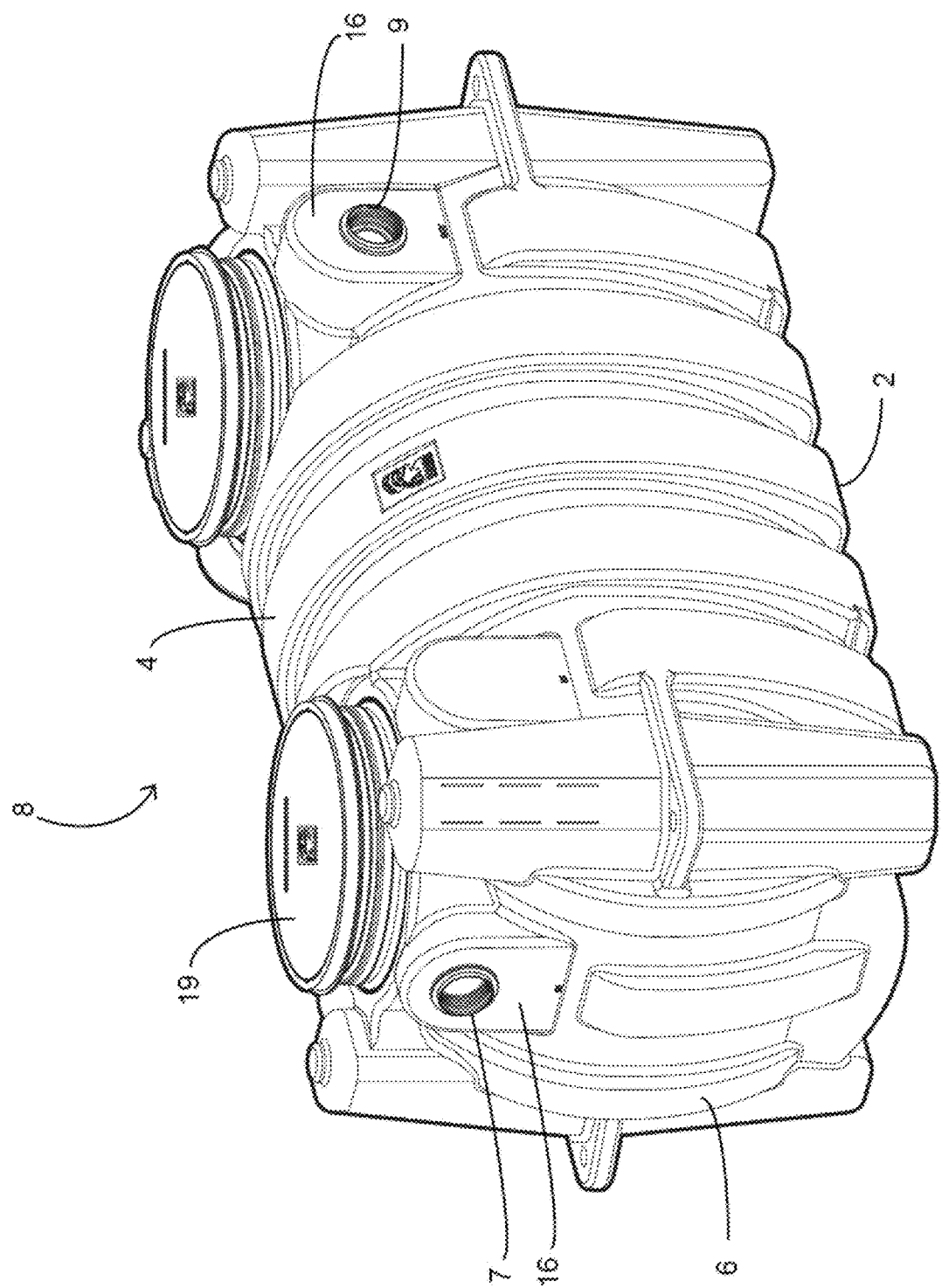
FIG. 1 is a perspective view of a separation device according to one embodiment of the present invention.
Figure 2:
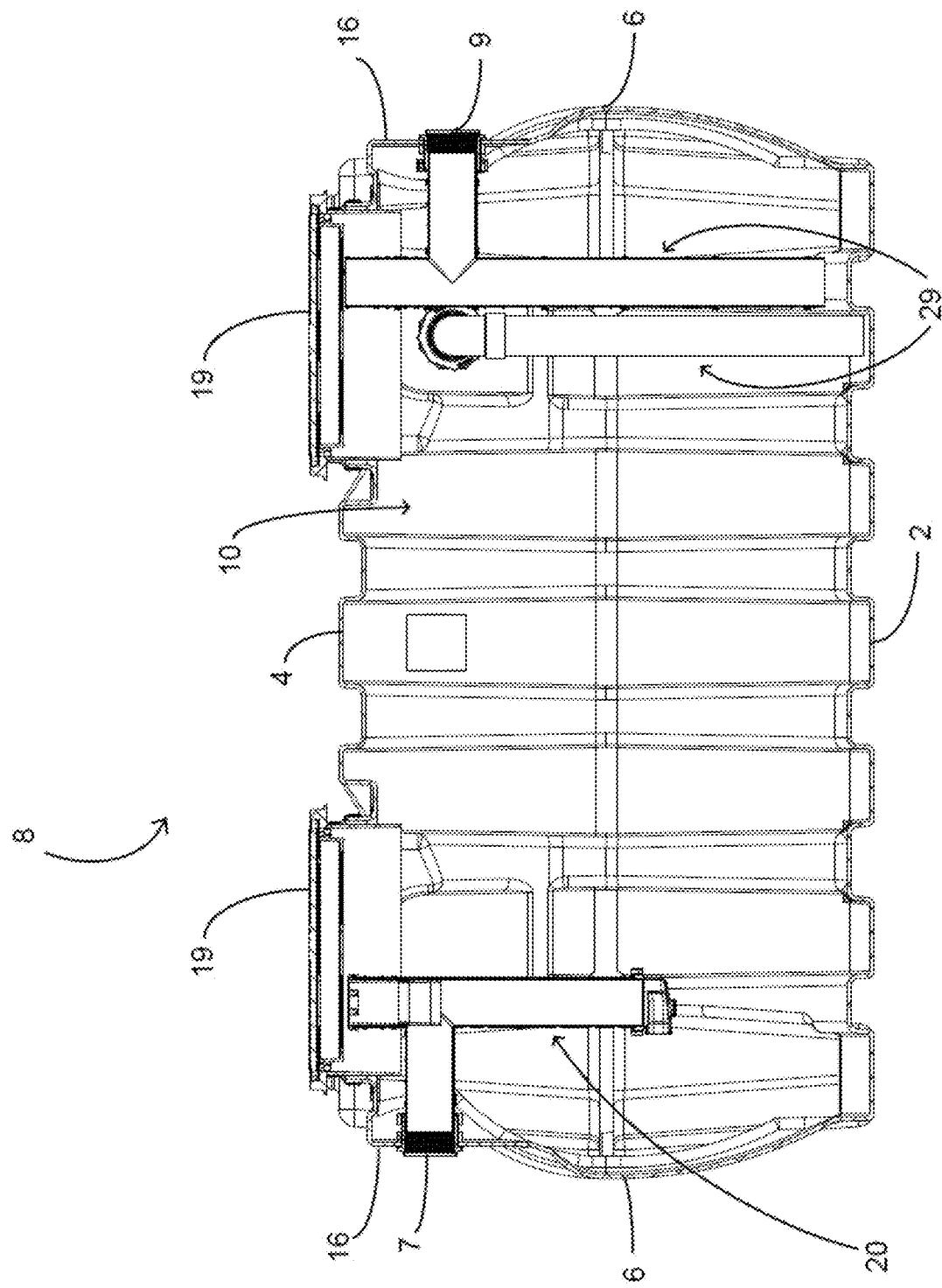
FIG. 2 is a cross-section side view showing the internal components of a separation device according to one embodiment of the present invention.
Figure 3:
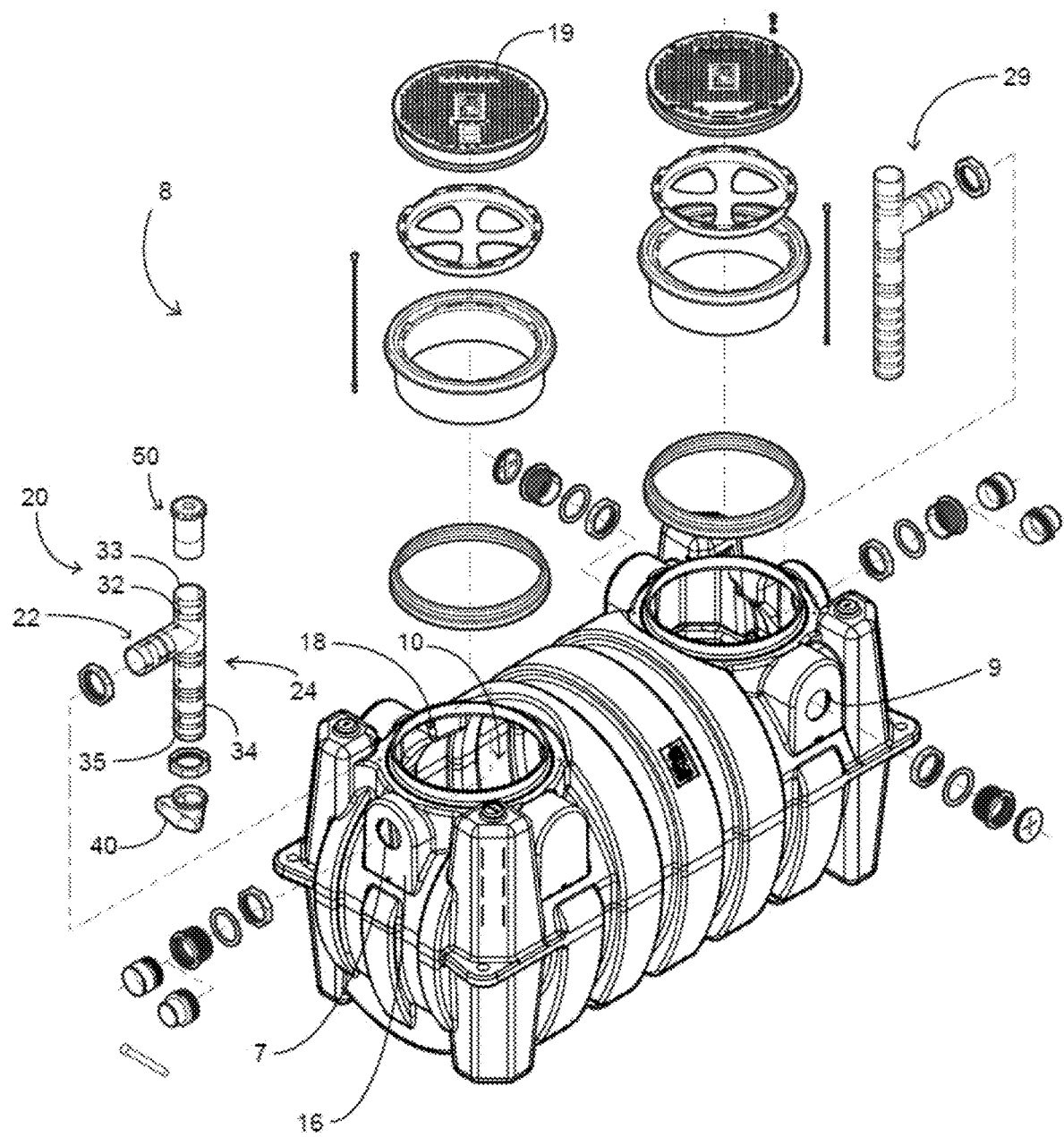
FIG. 3 is an exploded view of a separation device according to one embodiment of the present invention.

FIGS. 1-3 illustrate a separation device 8 that may be used for treating an effluent stream. In particular embodiments, separation device 8 is a grease interceptor or grease trap device. Effluent streams may generally comprise water, lighter-than-water materials and/or heavier-than-water materials. The separation device 8 is generally characterized as a container having a base portion 2, ceiling portion 4, and sidewall 6 that extends upwardly from the base 2 to the ceiling portion 4. Base portion 2, sidewall 6, and ceiling portion 4 cooperatively define a separation compartment 10 in the interior of the device 8. In the embodiment of FIG. 1, device 8 has an irregular shape including rounded ribs 5 formed in base portion 2, ceiling portion 4, and sidewall 6. However, it is within the scope of the invention that device 8 has other geometries, including but not limited to, traditional rectangular prism or cuboid geometries having a defined base, ceiling, sidewalls, and edges. Separation device 8 can be sized to accommodate virtually any suitable inlet flow rate and/or grease content of the effluent streams. However, in certain embodiments, separation device 8 is configured to receive and effectively treat from about 5 to about 600 gallons per minute, 10 to about 400 gallons per minute, or about 20 to about 200 gallons per minute of effluent. In certain embodiments, separation device 8 has a liquid capacity of about 5 gallons to about 5000 gallons, or about 10 gallons to about 1000 gallons.

As shown in FIG. 1, sidewall 6 comprises one or more sidewall projections 16 that include one or more inlet ports 7 that extend through the sidewall projections 16 to provide fluid communication between the exterior of device 8 and separation compartment 10. However, it will be understood that the inlet ports 7 may be formed directly in sidewall 6 without sidewall projections 16. Sidewall 6 also comprises one or more outlet ports 9, which may also be formed in sidewall projections 16, that extend through sidewall portion 6 to provide fluid communication between the exterior of device 8 and separation compartment 10. Ceiling portion 4 further comprises one or more access ports 18, which may be covered by lid 19.

Generally speaking, the effluent stream flows from an effluent source (not shown), through the one or more inlet ports 7, across the separation compartment 10 and out through the one or more outlet ports 9 that ultimately communicates the flow to an effluent drain such as a sewer (not shown). In certain embodiments, a passive separation process occurs during the progression of the effluent stream across separation compartment 10. The passive separation process is distinguished from active separation processes that require pumps and/or other moving parts to effect separation of the effluent stream. In certain embodiments, the separation process is a hydromechanical separation process, which may comprise a gravity separation process aided by flow control, air entrapment, interior baffles, and/or other mechanism. In certain such embodiments, separation device 8 may therefore be considered a hydromechanical interceptor as defined in ASME A112.14.3-2018. However, it should be understood that other types of passive or active separation processes may occur in separation compartment 10 within the scope of the present invention. In the separation process, one or more light components generally will buoyantly migrate to a top layer near the water line, and/or one or more heavy components sink to a bottom layer adjacent the base 2.

Figure 4:
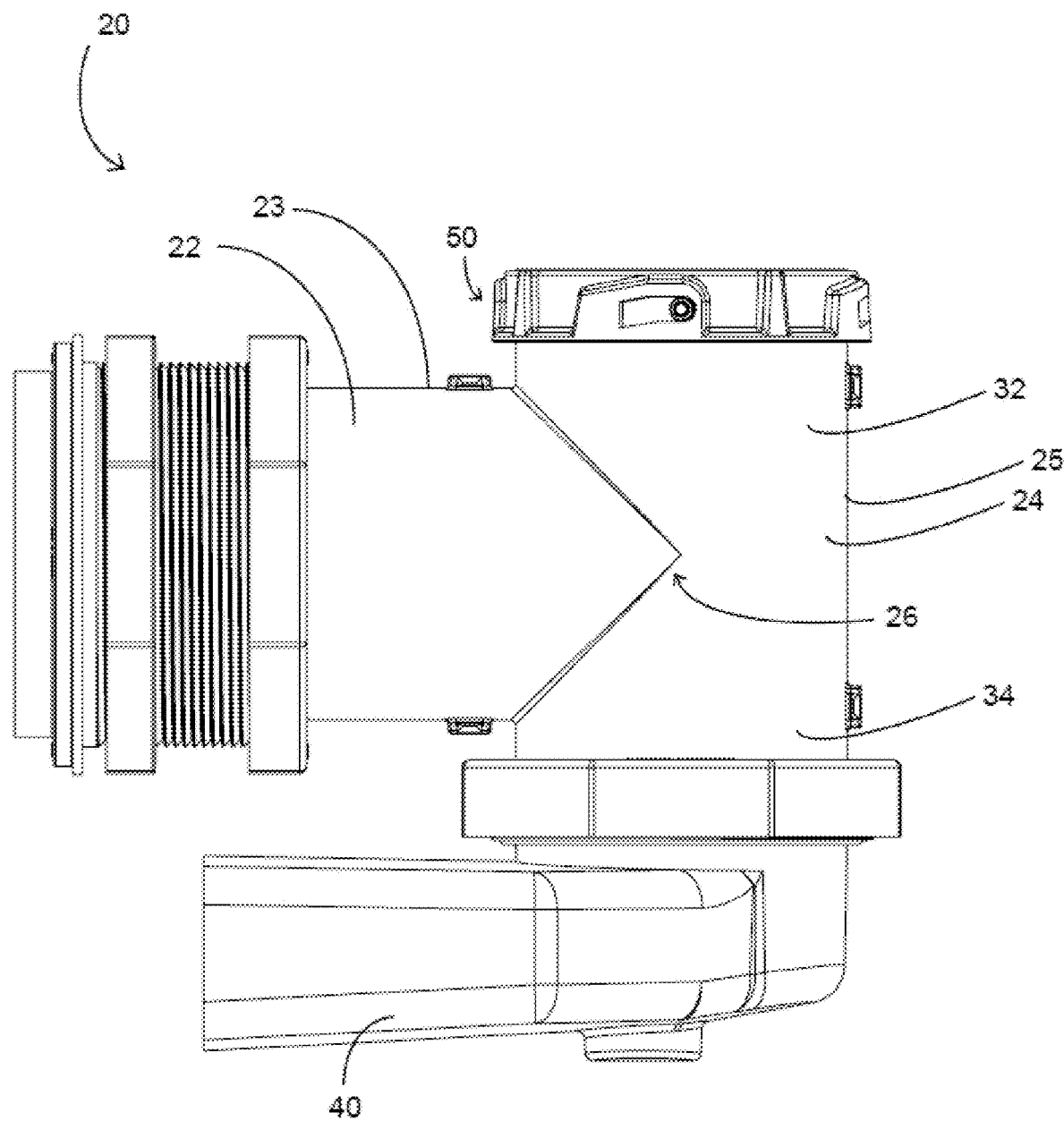
FIG. 4 is a side view of a conduit assembly according to one embodiment of the present invention.

A preferred embodiment of the present inventive concept also includes one or more conduit assemblies 20 bearing effluent flowing into and/or out of separation device 8. As shown in FIG. 4, conduit assembly 20 generally comprises a first conduit segment 22 coupled to a second conduit segment 24 and defining a juncture 26 between first segment 22 and second segment 24. As used herein, the term "juncture" generally refers to the intersection of two or more passages in fluidic communication to allow distribution of fluid or to change the direction of flow of the fluid. In certain embodiments, first conduit segment 22 and second conduit segment 24 may advantageously be provided as a monolithic body. However, it is within the scope of the present invention that first conduit segment 22 and second conduit segment 24 be provided as separate components that are secured together. In one or more preferred embodiments, conduit assembly 20 further comprises insert 50 configured to control or alter fluid flow dynamics (e.g., flow rate, flow velocity, etc.) through conduit assembly 20, as described in greater detail below.

First conduit segment 22 comprises an elongated main body 23 defining a hollow passage 21 configured for fluid flow through sidewall portion 6. As shown illustrated herein, in use, first conduit segment 22 is coupled to sidewall 6 via sidewall projection 16. First conduit segment 22 is removably secured to sidewall 6 using one or more bulkhead connections, end fittings, gaskets, and/or retaining nuts. Other hardware and methods of securing first segment 22 to sidewall 6 may also be used within the scope of the present invention, so long as conduit assembly 20 is sufficiently secured so as to allow fluid flow through conduit assembly 20 without substantial movement and/or leaking. An exemplary method of securing a conduit segment to a sidewall portion is described in U.S. Pat. No. 10,315,135, incorporated by reference herein.

Second conduit segment 24 generally comprises body 25 defining a hollow passage 27 configured to allow fluid flow from passage 21 of first conduit segment 22 through second conduit segment 24 and into separation compartment 10. Fluid flow is enabled by aperture 30 formed in the sidewall of body 25 located at, and at least partially defined by, juncture 26. Aperture 30 defines an opening through which the incoming effluent stream may be redirected and/or the flow rate or velocity reduced as it passes from first conduit segment 22 to second conduit segment 24.

Body 25 of second conduit segment 24 generally comprises an elongated upper stem segment 32 extending upward from aperture 30 and having top opening 33, as well as an elongated lower stem segment 34 extending downward from aperture 30 and having bottom opening 35, which provides fluid communication between conduit assembly 20 and separation compartment 10. In one or more embodiments, top opening 33 vents to separation compartment 10, although the opening may be closed or sealed, for example by an insert or cap, as described herein. As shown in the embodiments of the figures, one or both of upper stem segment 32 and lower stem segment 34 may be vertically-oriented relative to separation device 8, although it is within the scope of the present invention for the segments to be angled. In one or more embodiments, upper stem segment 32, lower stem segment 34, and/or the entirety of body 25 body comprises a substantially cylindrical shape.

Figure 5:
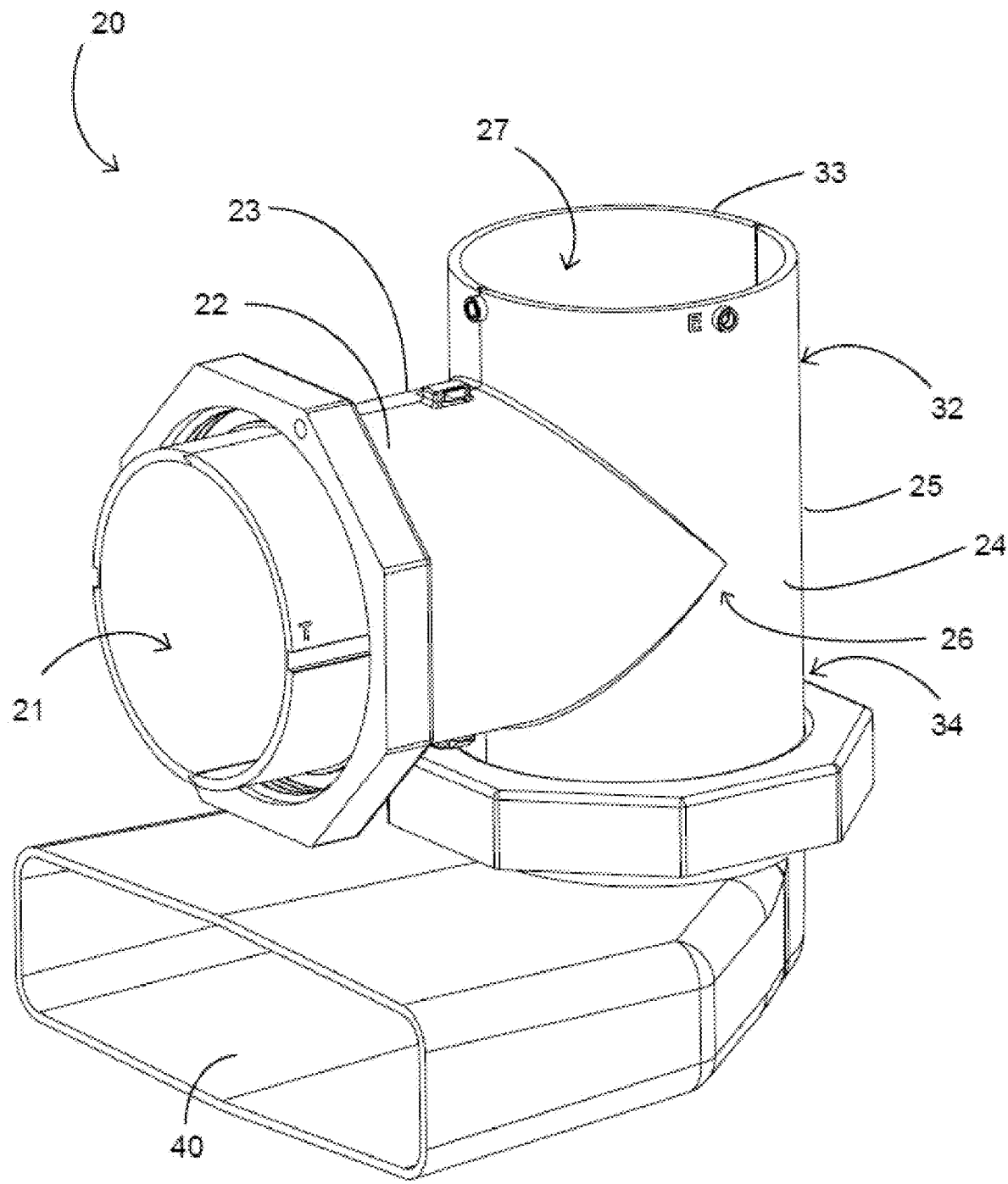
FIG. 5 is a perspective view of a conduit assembly according to one embodiment of the present invention.

In one or more embodiments, a bottom segment 40 is attached to lower stem segment 34, distal from the top opening 33 and directly adjacent bottom opening 35 of stem segment 34. Bottom segment 40 extends from the bottom opening 35 in a direction that is substantially perpendicular to the direction of elongation of lower stem segment 34. Bottom segment 40 is illustrated in FIG. 5 in a wide-mouth diffuser style.

As illustrated in the embodiments herein, second conduit 24 is illustrated as a diffuser-style inlet conduit for carrying effluent from first conduit 22 to the separation compartment 10. The majority of separation achieved by separation device 8 occurs as effluent flow travels across the separation compartment 10 between conduit assembly 20 and one or more outlet conduit assemblies 29. The one or more outlet conduit assemblies will typically be of similar construction as the one or more inlet conduit assemblies 20, and therefore an exemplary inlet conduit assembly is described in more detail herein with the understanding that its teachings are also applicable to the outlet conduit assemblies. It is further foreseen that the outlet conduit assemblies described above but not shown in the Figures may be of complimentary or different design from the inlet conduit described herein without departing from the spirit of the present inventive concept. It is still further foreseen that the outlet conduit may be of the construction described herein and attributed to an inlet conduit, while the inlet conduit may comprise a different design, without departing from the spirit of the present inventive concept.

It is foreseen that the shape and composition of first conduit segment 22, second conduit segment 24, stem segments, 32, 34, openings 33, 35, and/or bottom segment 40 may be substantially altered and/or optimized for various applications without departing from the spirit of the present inventive concept. In certain embodiments, first conduit segment 22 may have a length of about 6 inches to about 5 feet, or about 1 foot to about 2 feet. In certain embodiments, second conduit segment 24 may have a length of about 1 foot to about 20 feet, or about 2 feet to about 5 feet.

Figure 6:
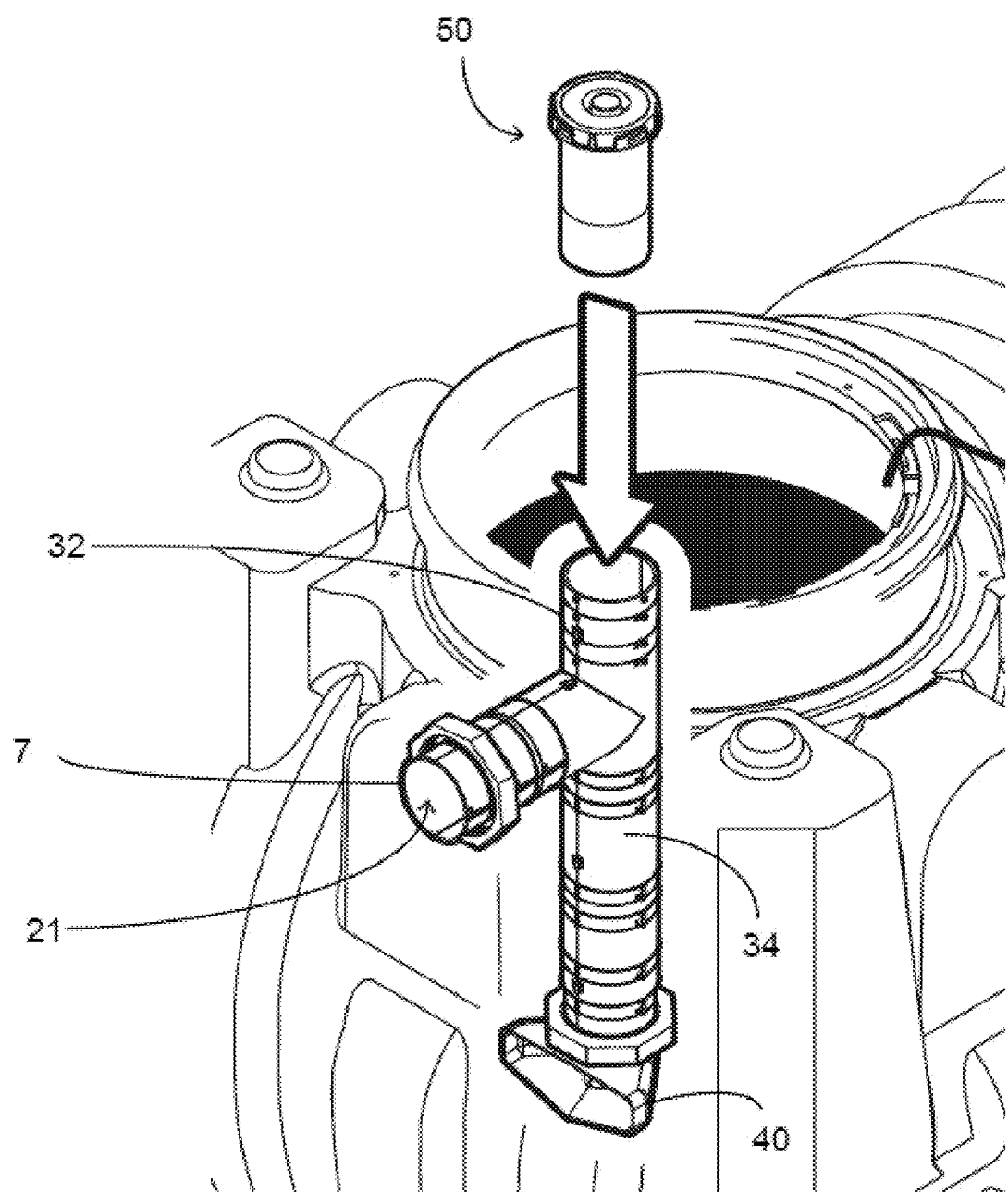
FIG. 6 is an isolated perspective view of a conduit assembly installed in a separation device according to one embodiment of the present invention.

As shown in FIG. 6, insert 50 is illustrated herein as an inset or cartridge component that is configured to be removably received within top opening 33 of upper stem segment 32. Insert 50 generally comprises cap piece 60 and projection 70 extending from a bottom surface of cap piece 60. When installed, projection 70 of insert 50 extends from cap piece 60 into passage 27 of upper stem segment 32 through top opening 33. In one or more embodiments, both projection 70 and upper stem segment 32 have substantially cylindrical shape, such that upper stem segment 32 and projection 70 form a sleeve-fit engagement.

Figure 7:
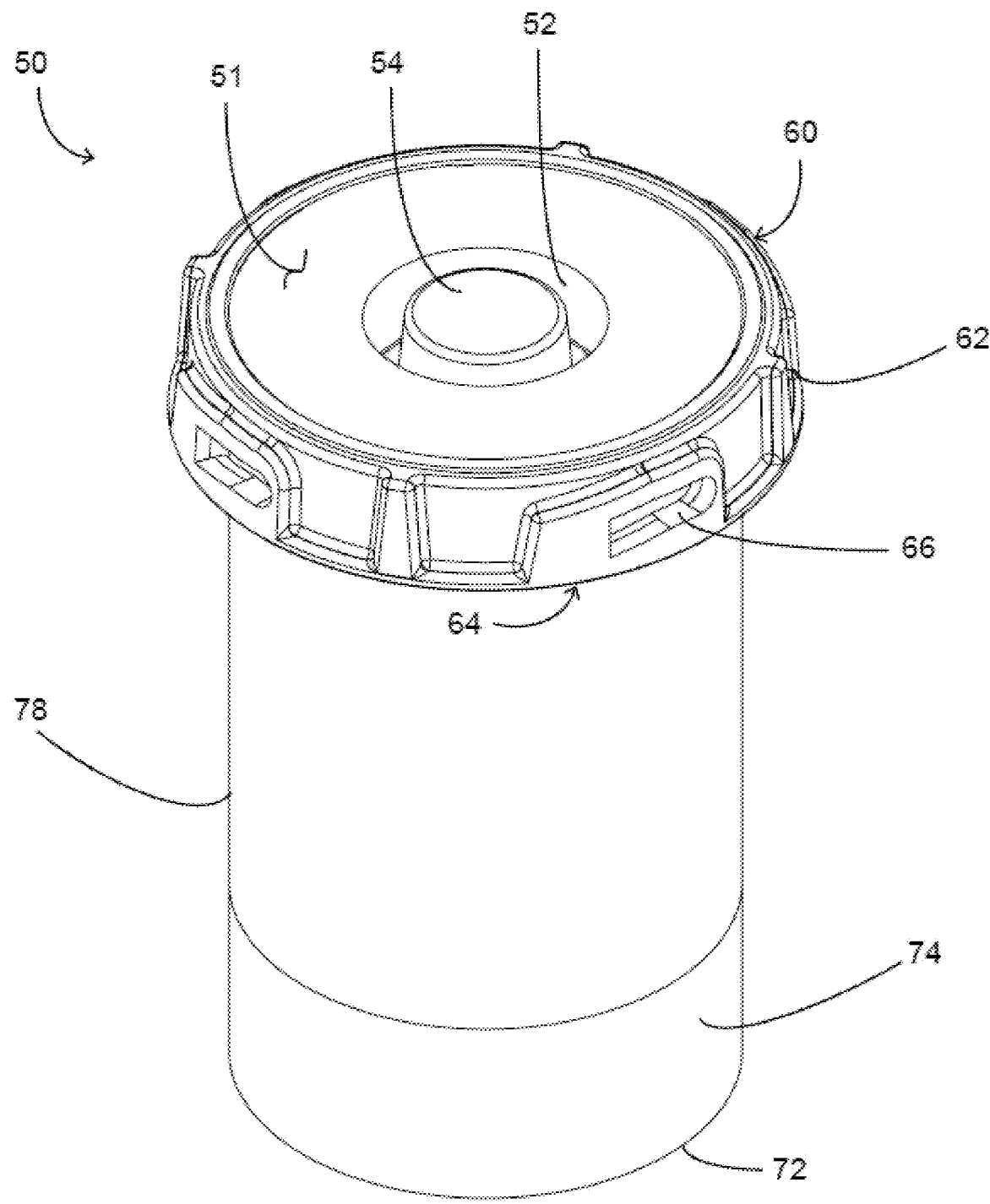
FIG. 7 is a perspective top view of an insert cartridge according to one embodiment of the present invention.
Figure 8:
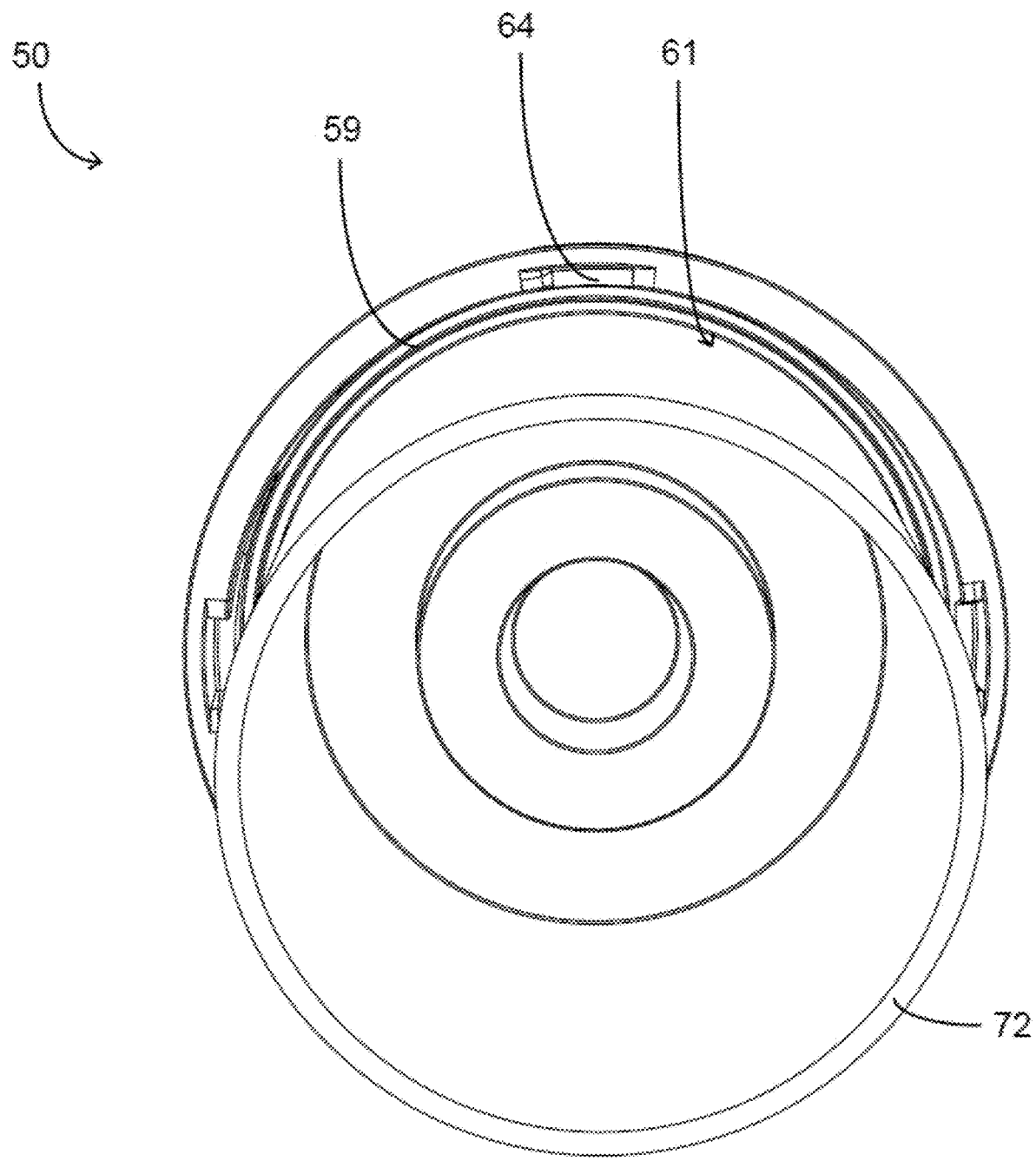
FIG. 8 is a perspective bottom view of an insert cartridge according to one embodiment of the present invention.

Turning to FIG. 7, cap piece 60 generally comprises annular perimeter wall 62 spaced-apart radially from projection 70 so as to at least partially define a channel 61 therebetween (FIG. 8) configured to receive and engage rim 31 of top opening 33. In one or more embodiments, cap piece 60 comprises additional features that operate in conjunction with upper stem segment 32 to quickly and easily allow an operator to install and uninstall insert 50 into conduit assembly 20.

In one or more embodiments, annular perimeter wall 62 comprises one or more slots 64 formed in the interior surface of wall 62 positioned so as to receive corresponding retainer pins 36 protruding from the exterior sidewall surface of upper stem segment 32 adjacent top opening 33. Annular perimeter wall 62 further comprises one or more elongated grooves 66 formed circumferentially therein. Each elongated groove comprises a fastening portion 67 and a sloped portion 68 having an angle relative to the perimeter edge of annular wall 62 different than fastening portion 67. Sloped portion 68 of elongated groove 66 is positioned between slot 64 and fastening portion 67 such that pin 36 can slide from slot 64 to fastening portion 67 by twisting or rotating cap piece 60 in a clockwise or counter-clockwise direction.

Figure 9:
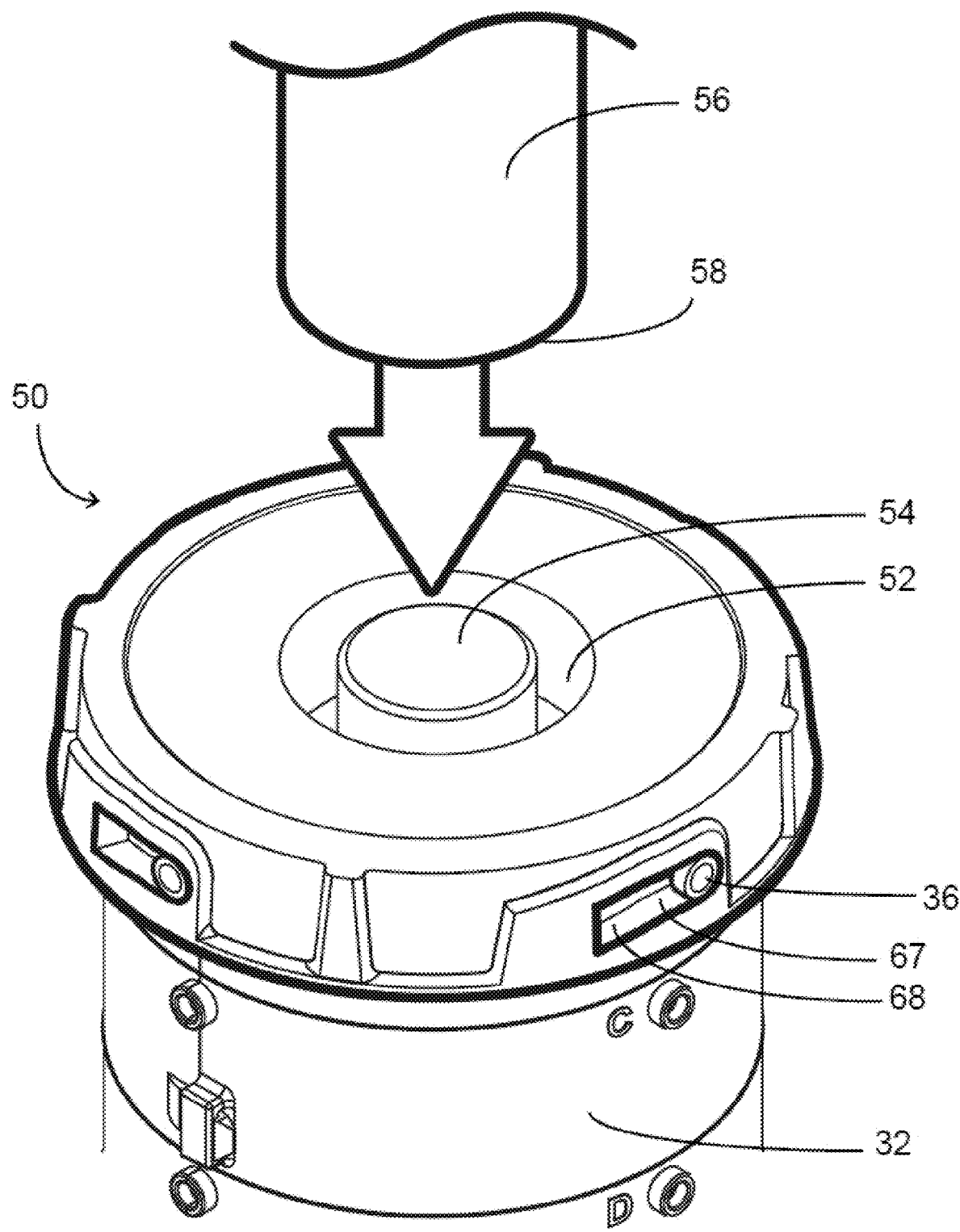
FIG. 9 is a perspective top view of an extension handle being installed on an insert cartridge installed in a conduit assembly according to one embodiment of the present invention.

As best shown in FIG. 9, in one or more embodiments, cap piece 60 comprises a depression 52 and/or tongue segment 54 formed in an upper surface 51 of cap piece 60. Depression 52 is illustrated as a circular trench and tongue segment 54 is illustrated as a substantially cylindrical rod residing in, and defining an inner wall of, depression. Depression 52 and tongue segment 54 may be used to attach a temporary or permanent extension handle to cap piece 60 to assist an operator in installing and uninstalling insert 50, for example in deep burial separation device (e.g., grease interceptor) installations. As shown in FIG. 9, a pipe segment 56, such as 1½" PVC schedule 40 pipe, may be attached to cap piece 60 by inserting pipe end 58 into depression 52 around tongue 54. An adhesive, such as PVC primer and cement, may be used to permanently secure pipe segment 56 to cap piece 60.

In one or more embodiments, cap piece 60 comprises annular gasket 59 residing within channel 61. Annular gasket may be comprised of any number of typical gasket materials known in the art, such as resilient rubber and polymer materials. When insert 50 is installed, gasket 59 provides a liquid-tight (and optionally air-tight) seal between top opening 33 and separation compartment 10. As used herein, the liquid-tight seal means that water and other effluent liquids will not pass through top opening 33 into separation compartment 10, even though effluent will flow into separation compartment 10 through other outlets formed in conduit assembly 20, such as bottom opening 35.

Figure 10:
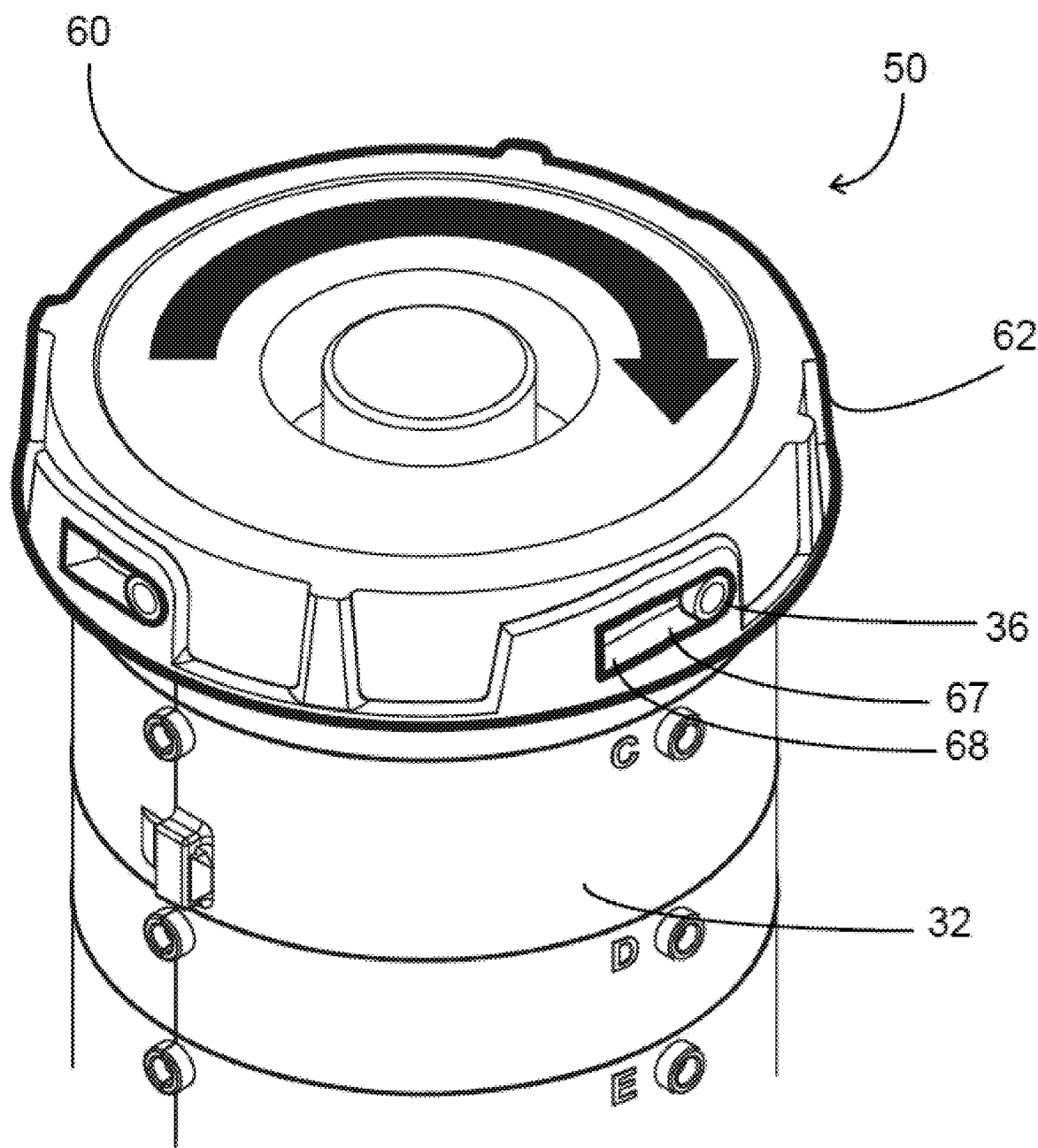
FIG. 10 is a perspective top view of an insert cartridge being installed in a conduit assembly according to one embodiment of the present invention.

Embodiments of the present invention provide for simple installation and removal of insert 50 without decoupling first conduit segment 22 of conduit assembly 20 from sidewall 6 or removing conduit assembly 20 from separation compartment 10 of separation device 8. To install insert 50 into conduit assembly 20, projection 70 is placed or slid through top opening 33 into passage 27 of upper stem segment 32. The one or more slots 64 formed in perimeter wall 62 of cap piece 60 should be aligned with the one or more pins 36 on upper stem segment 32 so that cap piece 60 slides onto, and in certain embodiments contacts with, rim 31 of top opening 33. Cap piece 60 can then be rotated, for example in a clock-wise direction thereby sliding pins 36 through sloped portion 68 into fastening portion 67 of groove 66. See FIG. 10. In such embodiments, the one or more grooves 66 of cap piece 60 are slidably engaged with the one or more pins 36 in a manner so as to "pull" cap piece 60 down onto top opening 33 and secure insert 50 to conduit assembly 20.

Figure 11:
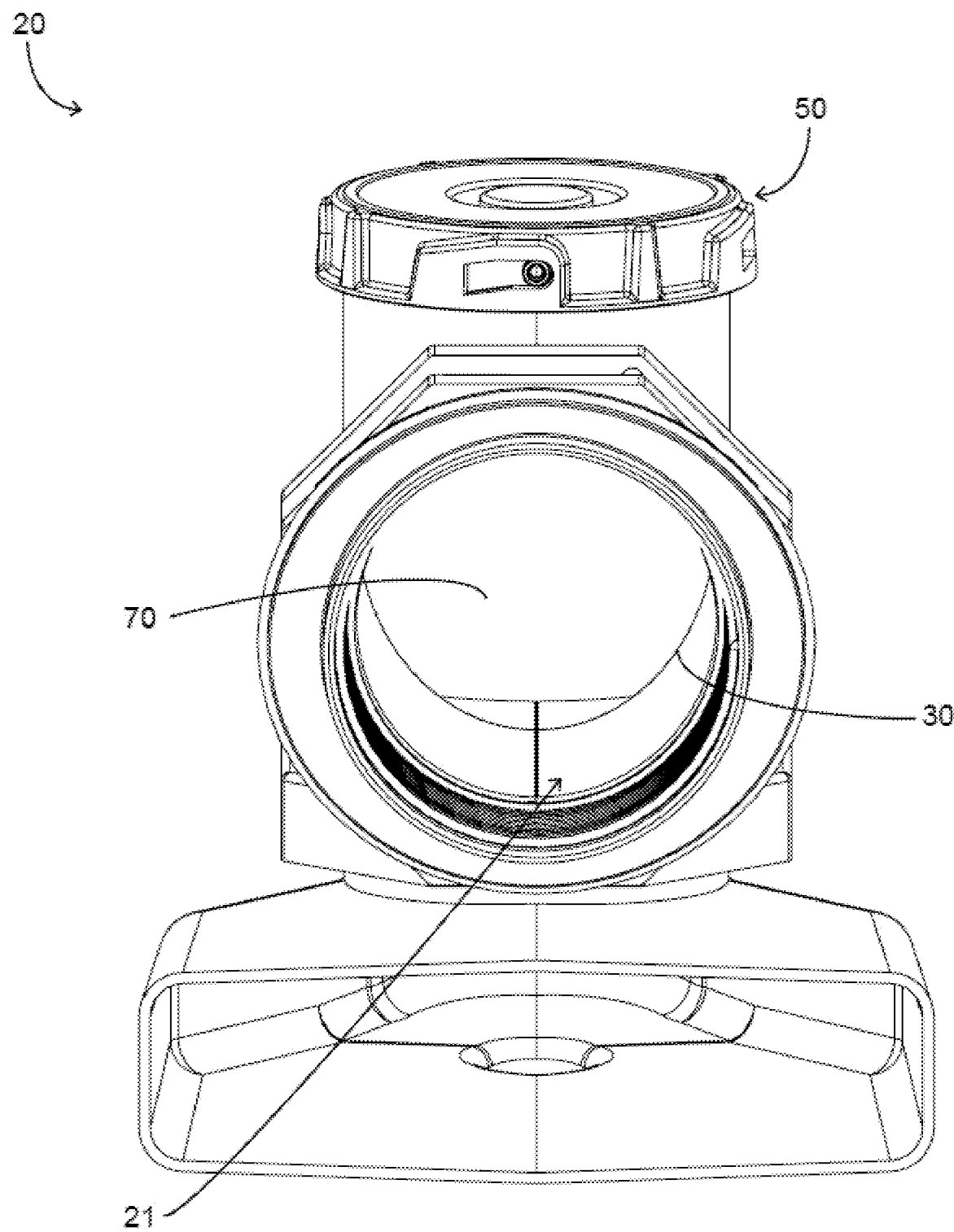
FIG. 11 is a front view of a conduit assembly including an insert cartridge installed therein according to one embodiment of the present invention.

As best shown in FIG. 11, when insert 50 is securely installed, projection 70 extends into passage 27. In the illustrated embodiments, projection 70 extends far enough into passage 27 such that rim 72 defining the end of projection 70 is positioned adjacent aperture 30 at juncture 26. Projection 70 is thus positioned so as to at least partially block or obstruct fluid flow from first conduit segment 22 through aperture 30 into second conduit segment 24. The length of projection 70 may be selected or varied, for example using extension attachments 74, so as to achieve the desired degree of obstruction, and thus fluid flow restriction, through conduit assembly 20. Generally, the outer diameter of projection 70 will be about the same as, or only slightly smaller than, the inner diameter of second conduit segment 24.

Figure 12:
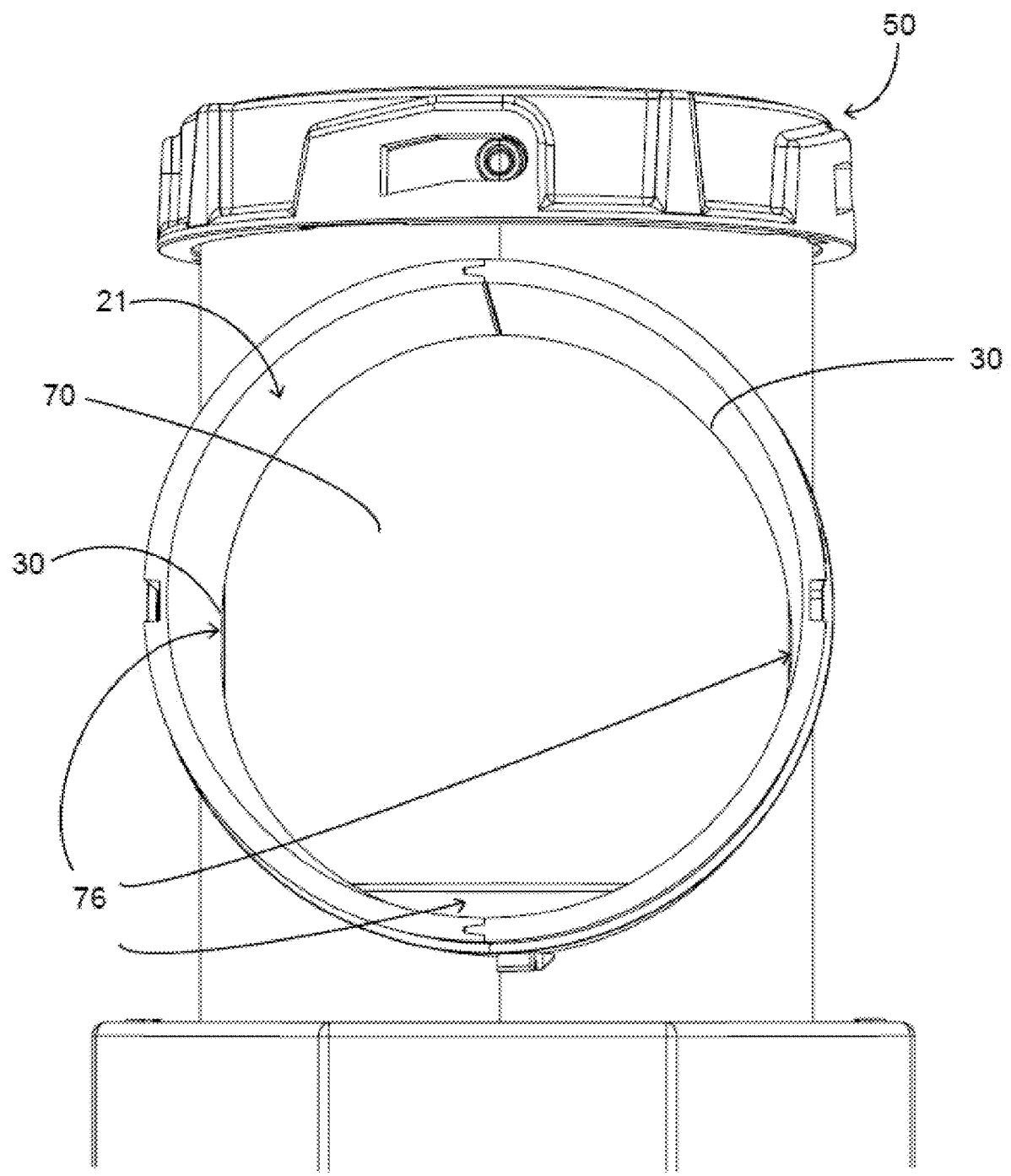
FIG. 12 is an interior view of a conduit assembly including an insert cartridge installed therein according to one embodiment of the present invention.

In one or more embodiments, conduit assembly 20 is advantageously configured such that fluid flow may be obstructed or restricted through aperture 30 without a seal or attachment formed between projection 70 and aperture 30. In certain such embodiments, a gap 76 is present between the sidewall portion 78 of projection 70 and aperture 30. See FIG. 12. It has been surprisingly discovered that fluid flow can be sufficiently obstructed or restricted despite the presence of gap 76 around and below projection 70 and without a seal between these components. This significantly and advantageously simplifies installation and maintenance of the flow control mechanism compared to prior methods, since first conduit segment 22 does not need to be separated from second conduit segment 24 and no gaskets or small hardware components are necessary to secure the flow control mechanism in place. This also allows for first conduit segment 22 and second conduit segment 24 to be provided as a single monolithic body.

During operation of separation device 8, and particularly during operation as a grease interceptor, passage 21, passage 27, and/or aperture 30 may become clogged by materials deposited by an effluent stream flowing through separation device 8. After a pre-determined period of time, maintenance on the device 8 may be conducted by simply "unscrewing" insert 50 by rotating cap piece 60 such that pin(s) 36 slide from fastening portion 67 through sloped portion 68 into slot 64 and lifting projection 70 out of upper stem segment 32. Passageways 21, 27 and aperture 30 may then be easily accessed through top opening 33 to remove the deposited materials from conduit assembly 20. Such maintenance steps can be performed while conduit assembly, and particularly first conduit segment 22, remains affixed to sidewall 6. In certain embodiments, insert 50 and conduit assembly 20 may be accessed through an access port 18, which may be covered by a lid 19 when not in use.

It is foreseen that the present inventive concept may be implemented in numerous devices experiencing non-pressurized flow across the conduit joints taught herein. However, the present inventive concept may also be implemented in devices experiencing pressurized flow across such joints, which is generally considered to increase the need for a better seal between conduit assembly components and separation device 8. One or more gaskets, silicone fillings, or the like may be used between components as needed to form a more complete seal against effluent leakage. It is foreseen that alternative means of enhancing the seal(s) formed at such joint(s) may be used without departing from the spirit of the present inventive concept.

Although the above description presents features of preferred embodiments of the present inventive concept, other preferred embodiments may also be created in keeping with the principles of the invention. Furthermore, these other preferred embodiments may in some instances be realized through a combination of features compatible for use together despite having been presented independently in the above description.

Furthermore, directional references (e.g., top, bottom, front, back, up, down, etc.) are used herein solely for the sake of convenience and should be understood only in relation to each other. For instance, a component might in practice be oriented such that faces referred to as "top" and "bottom" are sideways, angled, inverted, etc. relative to the chosen frame of reference.

It is also noted that, as used herein, the terms axial, axially, and variations thereof mean the defined element has at least some directional component along or parallel to the axis. These terms should not be limited to mean that the element extends only or purely along or parallel to the axis. For example, the element may be oriented at a forty-five degree (45°) angle relative to the axis but, because the element extends at least in part along the axis, it should still be considered axial. Similarly, the terms radial, radially, and variations thereof shall be interpreted to mean the element has at least some directional component in the radial direction relative to the axis.

It is further noted that the term annular shall be interpreted to mean that the referenced object or structure extends around a central opening so as to be generally toroidal or ring-shaped. It is not necessary for the object to be precisely circular, nor does the object have to be continuous. Similarly, the term toroidal shall not be interpreted to mean that the object must be circular or continuous, as other geometries may be used including oval, polygonal, rectangular, etc. depending upon the particular feature design.

It should still further be noted that, in one construction, the separation device is molded from medium density polyethylene to inhibit corrosion and leaking. In other constructions, the container can be formed from other suitable materials, including other types of polymers or plastics, metals, composites, and the like (e.g., fiberglass reinforced composites, etc.) using any suitable method.

The preferred forms of the invention described above are to be used as illustration only and should not be utilized in a limiting sense in interpreting the scope of the present inventive concept. Obvious modifications to the exemplary embodiments, as hereinabove set forth, could be readily made by those skilled in the art without departing from the spirit of the present inventive concept.

The inventors hereby state their intent to rely on the Doctrine of Equivalents to determine and assess the reasonably fair scope of the present inventive concept as pertains to any apparatus not materially departing from but outside the literal scope of the invention set forth in the following claims.

The invention claimed is:

1. A separation device comprising:
    a sidewall at least partially defining a separation compartment;
    an inlet conduit assembly configured to flow effluent into the separation compartment, the inlet conduit assembly including—
        a first conduit segment coupled to an inlet port formed in said sidewall and comprising a main body defining a hollow passage configured for fluid flow through said sidewall;
        a second conduit segment coupled to said first conduit segment and defining a juncture between said first conduit segment and said second conduit segment, said second conduit segment comprising an aperture located at said juncture, an upper stem segment extending upward from said aperture and having a top opening, and a lower stem segment extending downward from said aperture and having a bottom opening providing fluid communication with said separation compartment; and
        an insert removably received within said top opening of said upper stem segment and at least partially obstructing fluid flow through said aperture.

2. The separation device of claim 1, wherein said insert comprises a projection extending into said upper stem segment from said top opening adjacent to said aperture.

3. The separation device of claim 2, wherein said inlet conduit assembly comprises an air gap between a sidewall of said projection and said aperture.

4. The separation device of claim 1, said lower stem segment further comprising a bottom segment extending from said bottom opening in a direction substantially perpendicular to said lower stem segment and configured to diffuse fluid flow through said bottom opening into said separation compartment.

5. The separation device of claim 1, further comprising an outlet conduit assembly configured to direct a treated effluent stream out of said separation compartment.

6. The separation device of claim 1, wherein said first conduit segment and said second conduit segment comprise a monolithic body.

7. A separation device comprising:
    a sidewall at least partially defining a separation compartment;
    a conduit assembly including—
        a first conduit segment coupled to said sidewall and comprising a main body defining a hollow passage configured for fluid flow through said sidewall;
        a second conduit segment coupled to said first conduit segment and defining a juncture between said first conduit segment and said second conduit segment, said second conduit segment comprising a substantially cylindrical stem segment extending from said juncture and having a top opening;
        an insert removably received within said top opening of said stem segment, said insert comprising a cap piece and a substantially cylindrical projection extending therefrom into said stem segment, said projection having a rim positioned adjacent to an aperture formed at said juncture, thereby at least partially obstructing fluid flow through said aperture.

8. The separation device of claim 7, wherein said cap piece comprises an annular perimeter wall spaced-apart from said cylindrical projection and at least partially defining a channel therebetween configured to receive and engage with said top opening.

9. The separation device of claim 8, wherein said cap piece comprises a gasket within said channel so as to provide a water-tight seal between said top opening and said separation compartment.

10. The separation device of claim 8, wherein said stem segment comprises one or more retainer pins protruding from an outer surface of said stem segment adjacent said top opening, wherein said annular perimeter wall comprises one or more slots formed in an interior surface of said annular perimeter wall and positioned so as to receive said retainer pins.

11. The separation device of claim 10, wherein said annular perimeter wall comprises one or more elongated grooves formed circumferentially therein adjacent said one or more slots and configured to slidably engage with said one or more retainer pins by rotating said cap piece relative to said stem segment.

12. The separation device of claim 11, wherein each of said one or more elongated grooves comprises a sloped portion and a fastening portion, said one or more elongated grooves being configured such that rotating said cap piece causes said one or more pins to slide from said one or more slots through said sloped portion into said fastening portion, thereby securing said insert to said stem segment.

13. The separation device of claim 7, wherein said cap piece comprises a depression and/or tongue segment formed in an upper surface thereof and configured to receive a pipe segment.

14. A method of servicing the separation device of claim 7, the method comprising:
    rotating said cap piece; and
    lifting said insert so as to remove said cylindrical projection from said stem segment.

15. The method of claim 14, wherein said rotating causes said one or more pins formed on an exterior surface of said stem segment to slide along one or more elongated grooves circumferentially formed in an annular perimeter wall of said cap piece.

16. The method of claim 15, wherein said cap piece comprises one or more slots formed on an interior surface of said annular perimeter wall, wherein each of said elongated grooves comprises a sloped portion and a fastening portion, wherein said rotating causes said one or more pins to slide from said fastening portion through said sloped portion into said one or more slots.

17. The method of claim 14, wherein said conduit assembly is accessed through an access port formed in a ceiling portion of said separation device.

18. The method of claim 17, wherein said cap piece comprises an extension handle extending therefrom toward said ceiling portion, wherein said rotating comprises rotating said extension handle.

19. The method of claim 14, wherein said insert is removed from said conduit assembly without decoupling said first conduit segment from said sidewall.

\* \* \* \* \*